July 21, 1925.  
J. J. NEUFELD  
METAL TIRE TAKE-UP  
Filed June 2, 1923
1,547,063
2 Sheets-Sheet 1
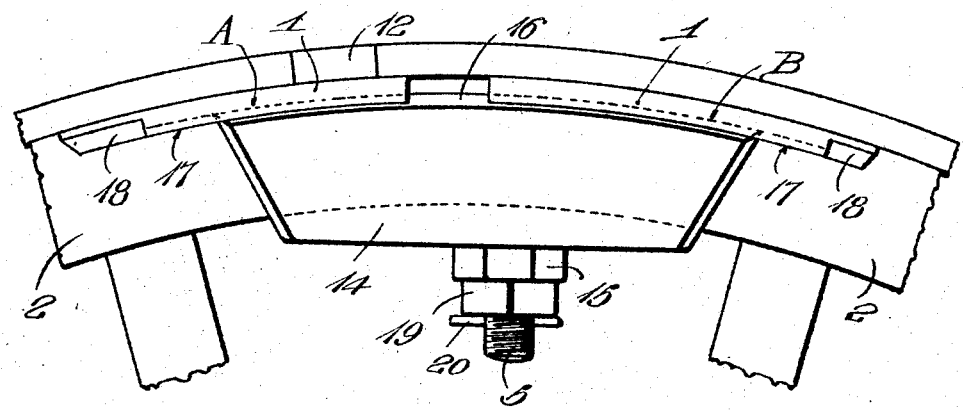
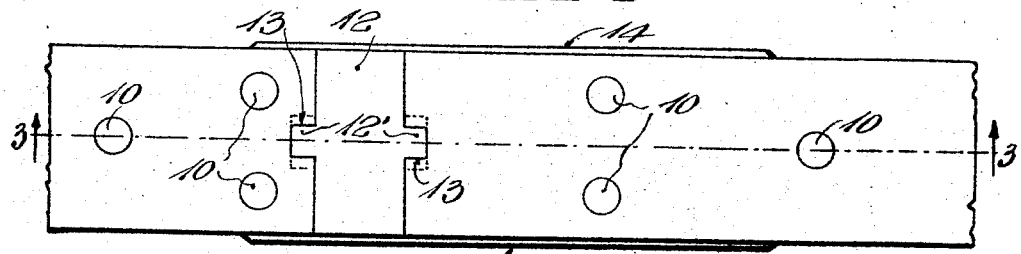
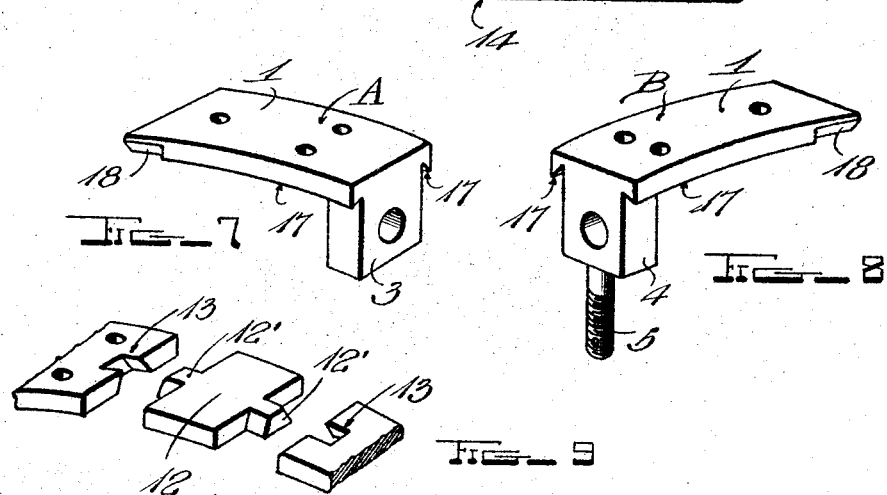
INVENTOR.  
Jacob J. Neufeld  
BY  
ATTORNEY July 21, 1925.
J. J. NEUFELD
METAL TIRE TAKE-UP
Filed June 2, 1923
1,547,063
2 Sheets-Sheet 2
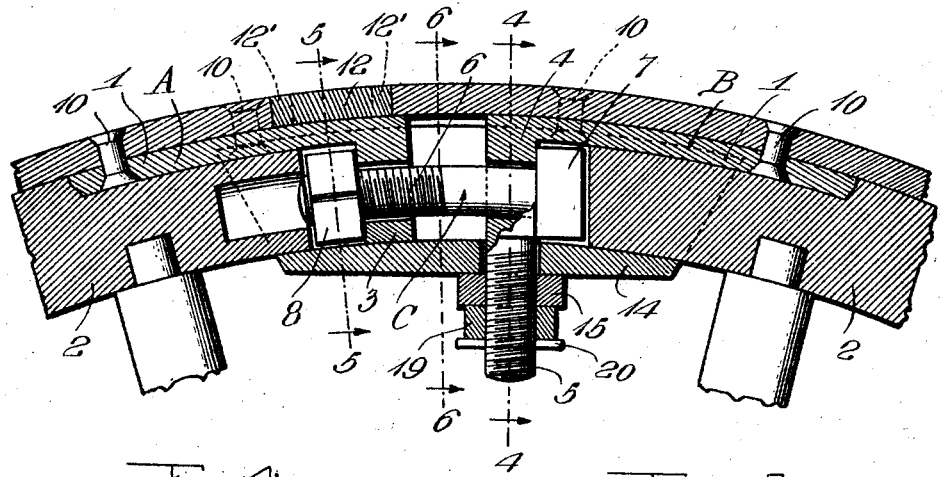
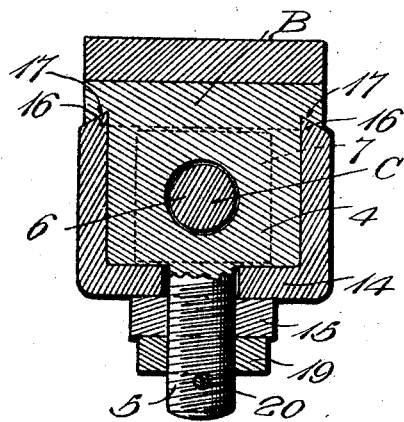
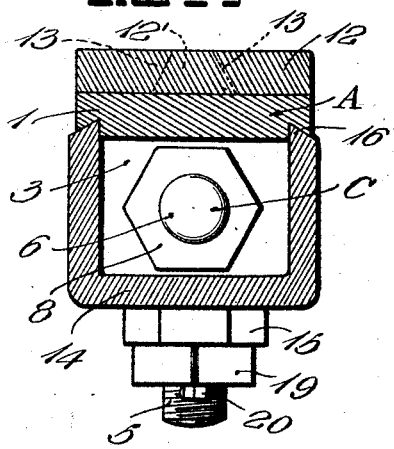
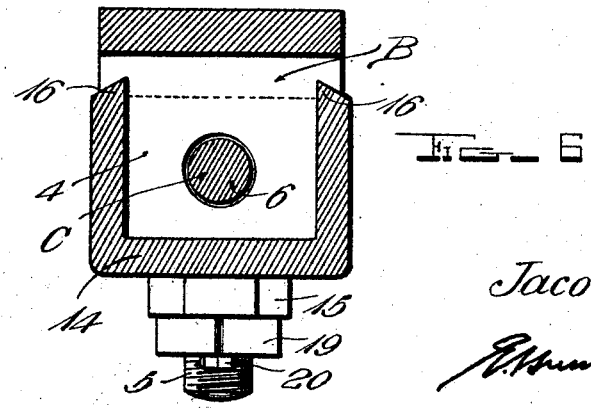
INVENTOR.
Jacob J. Neufeld
BY
ATTORNEY.

Patented July 21, 1925.

1,547,063

UNITED STATES PATENT OFFICE.

JACOB J. NEUFELD, OF RUSH LAKE, SASKATCHEWAN, CANADA.

METAL-TIRE TAKE-UP.

Application filed June 2, 1923. Serial No. 642,967.

*To all whom it may concern:*

Be it known that JACOB J. NEUFELD, a citizen of Canada, residing at Rush Lake, in the Province of Saskatchewan and Dominion of Canada, has invented new and useful Improvements in Metal-Tire Take-Ups, of which the following is a specification.

The object of the invention is to provide a simple, neat and effective device for interposition in the felly of the wheel of a metal tired vehicle, whereby the circumferential extent of the tire may be periodically adjusted to make up for shrinkage in the wooden felly, so that there may be no looseness or rattling of the tire in use.

With this object in view the invention consists in a construction and combination of parts of which a preferred embodiment is shown in the accompanying drawings, wherein:

Figure 1 is a side elevational view of a section of a metal tired wheel showing the application of the invention thereto.

Figure 2 is a top plan view of the same.

Figure 3 is a section on the line 3—3 of Figure 2.

Figures 4, 5 and 6 are respectively sectional views in the planes indicated by the lines 4—4, 5—5 and 6—6 of Figure 3.

Figure 7 is a detail perspective view of one of the complemental elements of the take-up.

Figure 8 is a similar view of the other of said complemental elements.

Figure 9 is a detail perspective view showing the filler plate or insert and the connecting ends of the tire.

The invention comprises essentially the complemental elements A and B and the connecting or adjusting elements C. The elements A and B are formed with the body plates 1 conforming in curvature on the outer face to the outer periphery of the wheel felly 2 in which they are inset, the felly having a segment removed for the reception of the ear plates 3 and 4 which are spaced from the adjacent ends of the felly, the ear plate 4 being formed with a depending exteriorly threaded stud 5. The ear plates 3 and 4 are radially disposed as is also the stud 5 and the segment removed from the felly is of greater length than the combined thickness of the two ear plates to provide an intervening space to permit adjustment of the elements A and B towards each other which is accomplished through the instrumentality of the adjusting element C which consists of a bolt having an arcuate shank 6, a preferably square head 7 interposed between the ear plate 4 and the adjacent end of the felly, and a preferably hexagonal nut 8 engaged with the threaded extremity of the bolt and interposed between the ear plate 3 and the end of the felly adjacent said ear plate. Obviously the turning of the nut 8 on the shank 6 will effect movement of the ear plates towards each other with the desired adjustment of the elements A and B.

The arcuate body plates 1 are secured to the extremities of the metal tire by suitable fastening means such as rivets 10, so that adjustment of the elements A and B to take up for extension of the tire on the felly or to adjust to compensate for any looseness of the tire on the felly will result in bringing the extremities of the tire towards each other, thus reducing its circumference to effect firm binding engagement on the felly.

In order to make adjustment and contraction of the tire as a whole possible, it is necessary to have a filler or insert in the tire between the adjacent ends of the split and a plurality of such inserts are employed in connection with the invention, the initial installation requiring the largest insert, so that on shrinkage of the felly or expansion of the tire the insert may be removed and replaced with a shorter one which will permit contraction of the tire a distance equal to the differences between the two inserts. Such an insert is illustrated in Figure 9 and consists preferably of a metal plate 12 conforming in thickness and width to the tire and formed on opposite edges with dove-tailed lugs 12' engaging dove-tailed slots 13 formed in the adjacent ends of the tire, the dove-tailed slots having their narrower width opening on the outer face of the tire which places the greater width of the lugs against the wheel felly and thus secures the filler plates or inserts in place.

A shield or housing is provided to enclose the ear plates 3 and 4 of the elements A and B and also the adjusting elements C and this comprises a channel shaped member 14 the side flanges of which, on the upper edge are of arcuate conformation to conform to the contour of the underfaces of the body plates 1, the bottom wall of the housing, on the inner face being of arcuate shape to conform to the inner periphery of the felly and on the bottom face being straight to define a chord with respect to the wheel and thus provide a flat face for abutting engagement with a clamping or holding nut 15 threadingly engaged with the stud 5 on the ear plate 4, the web of the channel member 14 being provided with an eye or opening through which the stud 5 may pass. The upper edges of the flanges of the channel shaped member 14 are interlocked with the body plates 1 of the elements A and B, the upper edges of the flanges being inwardly deflected as indicated at 16 for engagement with under-cut lips 17 on the body plates 1. The under-cut lips 17 extend for substantially the full lengths of the body plates but are omitted at the extremities of the latter and the body plates are deflected inwardly, as indicated at 18 to avoid any lateral projection at the side of the wheel tending to engage obstructions of any kind.

The clamping nut 15 which holds the channel shaped housing 14 in enclosing relation with the adjusting elements, is locked in place by a lock nut 19 and as a further means of security, a cotter pin 20 is inserted transversely through the stud 5 below the lock nut 19.

The initial application of the invention to a wheel necessitates the selection of a filler plate or insert 12 of a length sufficient to permit a firm binding engagement of the tire on the felly. When the tire becomes loose as a result of continued use or from other causes, the tire may be further loosened by the removal of the housing 14 from the stud 5 and the nut 8 then rotated in a direction which will permit separation of the ear plate a sufficient distance to extend the tire to permit the removal of the insert. A shorter insert is then applied and the reverse movement imparted to the nut 8 which tends to draw the ear plates 3 and 4 towards each other and to reduce the circumferential extent of the tire. The adjusting element C is precluded from angular or turning movement with respect to the elements A and B because of the side surface of the head 7 of the adjusting element engaging the underface of the body plate 1 of the element B. The nut 8, however, may be rotated since that is not of sufficient radial extent to be obstructed by the body plate of the element A. After the desired seating of the nut has been obtained, however, and the channel shaped housing 14 attached, the bottom wall of the web of the housing engages one of the flanges of the nut 8 and precludes any turning movement of the latter and since the housing is firmly locked in place by its interlocking engagement with the body plate 1 and clamping nut 15 and attendant devices, the desired adjustment is maintained until it is necessary to effect a new adjustment.

Having described the invention, what is claimed as new and useful is:—

1. A metal tire take-up comprising, in combination with a split metal tire and wheel felly, adjustable elements inserted in the felly and connected with the tire on opposite sides of the split, the extremities of the tire being formed with dove-tailed slots, and a plurality of filler plates selectively insertable between the split extremities and provided with dove-tailed lugs engaging said dove-tailed slots to effect an interlocking engagement with the tire.

2. A device for the purpose indicated comprising, in combination with a split metal tire and a felly on which the tire is carried, said felly having a segment removed, adjusting elements of which each consists of an arcuate body plate disposed in facing relation to and secured to the tire and radial ear plates disposed in the space from which the sector is removed, an adjusting bolt connecting said ear plates and secured against turning movement with respect thereto, and a channel shaped housing having its flanges interlocked with said arcuate body plates and the web portion engageable with said adjusting nut to preclude rotation of the latter, one of said ear plates being provided with a threaded stud and lock nut for securing said housing in place.

3. A device for the purpose indicated comprising, in combination with a split metal tire and a felly on which the tire is carried, adjusting elements imbedded in the felly and respectively connected with the adjacent ends of the tire, adjusting means connecting said elements to effect movement towards and permit movement away from each other, one of said elements being provided with a threaded inwardly projecting radial stud, and a channel-shaped housing straddling the felly and having its flanges interlocked with said adjusting elements and its web portion provided with a hole through which said threaded stud passes and a lock nut engaged with said stud for securing the housing in place.

4. A device for the purpose indicated comprising, in combination with a split metal tire and a felly on which the tire is carried, adjusting elements imbedded in the felly and respectively connected with the adjacent ends of the tire, adjusting means connecting said elements to effect movement towards and permit movement away from each other, one of said elements being provided with a threaded inwardly projecting radial stud, and a channel-shaped housing straddling the felly and having its flanges interlocked with said adjusting elements and its web portion provided with a hole through which said threaded stud passes and a lock nut engaged with said stud for securing the housing in place, said housing engaging an element of the adjusting member to maintain the adjustment of the latter.

In testimony whereof he affixes his signature.

JACOB J. NEUFELD.